3,004,627
ARRANGEMENT FOR SEPARATING OUT FINE
SOLID PARTICLES DISPERSED IN GASES
Julius Wehn, Leverkusen, Germany, assignor to Farbenfabriken Bayer Aktiengesellschaft, Leverkusen, Germany, a corporation of Germany
Filed Jan. 20, 1959, Ser. No. 787,908
Claims priority, application Germany Jan. 21, 1958
3 Claims. (Cl. 183—83)

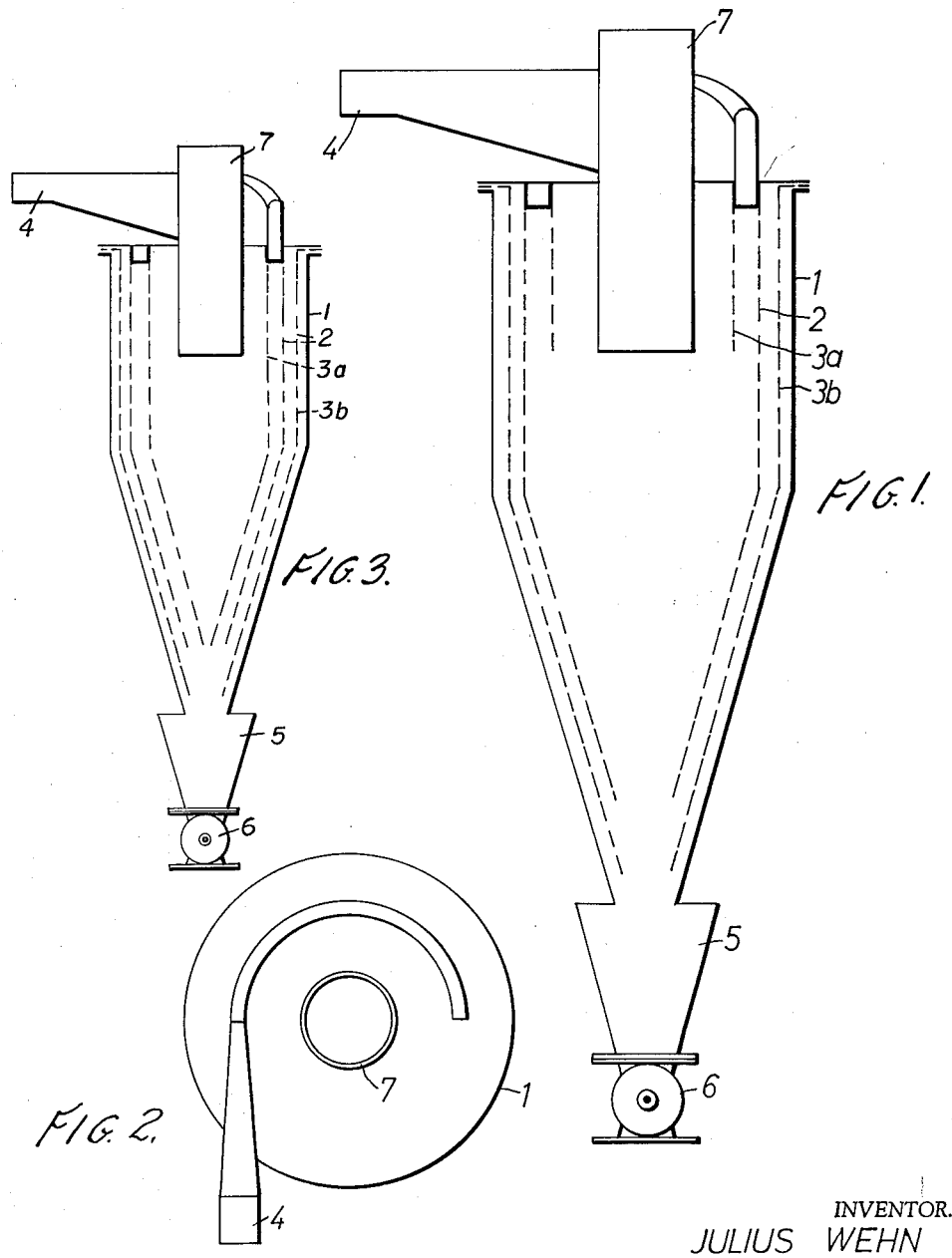

The present invention relates to an arrangement for separating finely divided solid particles from gases in which they are dispersed, said arrangement comprising a main cyclone-shaped gas-permeable and dust-permeable member arranged in a container and spaced from the internal walls thereof. The said member may, for example, be formed of screens.

With arrangements of this type, the degree of separation achieved, as is the case with cyclones having a solid casing, depends on the dust loading of the gas in terms of the number of kg. of dust per cubic metre of gas.

It has now been found that the degree of separation achieved, even with a low dust (e.g. color pigment) loading of, for example, below 0.005 kg. of dust per cubic metre of gas, can be considerably improved if, in accordance with the present invention, inner and/or outer screening members are arranged concentrically with respect to, and spaced from, the cyclone-shaped screening member. The additional screening members preferably have the same configuration as the main cyclone-shaped screening member.

The additional screening members enable ultra-fine particles on the main cyclone-shaped screening member to collide with one another and thereby to become granulated. The particles thus treated pass wholly or in part as granulated material through the walls of the additional screening members and are thus separated out.

In order that the invention may be more clearly understood a preferred embodiment thereof will now be described by way of example with reference to the accompanying diagrammatic drawing in which:

FIG. 1 is a longitudinal section of one form of apparatus in accordance with the invention, FIG. 2 is a plan view of the cover of the apparatus shown in FIG. 1 and FIG. 3 is a longitudinal section of another form of the apparatus in accordance with the invention.

In the drawing, 1 is an external container, 2 the main cyclone-shaped screening member, 3a an inner supplementary screening member, 3b an outer supplementary screeinng member, 4 an injection nozzle for introducing the mixture of gas and dust, the injection nozzle being provided with a curved flat injection pipe which opens on the cover of the apparatus, 5 a steadying chamber, 6 a bucket wheel for the discharge of granulates and 7 an outlet pipe for the gas.

Air or gas having finely divided dust particles dispersed therein is introduced into the apparatus through the injection nozzle 4. The mesh size of the main cyclone-shaped screening member 2 is such that most of the dust particles dispersed in the air or gas can pass through the member 2 together with a substantial portion of the air or gas. The disturbance in the air or gas flow on passing through the main cyclone-shaped screening member 2 and the impingement of the dust particles on the screen surface result in a granulation of the dust particles and the granulated particles are thus precipitated from the air or gas in which they were dispersed. Any particles adhering to the screen surface are continually removed as a result of the deformation of the screen which occurs under the influence of the flow of air or gas. The particles thus removed drop down into the stabilising chamber 5 as do also the granulated particles which have passed through the cyclone-shaped screening member 2. The cyclone-shaped screening member 2 and the external container 1 of the apparatus are open at the bottom end, so as to permit the major portion of the air or gas which has passed through the member 2 to rise and leave the apparatus through the discharge pipe 7.

The finely divided dust particles present in the minor portion of the air or gas which has not succeeded in passing through the main cyclone-shaped screening member 2 are separated by means of the inner supplementary screening member 3a which is arranged concentrically with respect to, and spaced from, the main cyclone-shaped screening member 2. An outer supplementary screening member 3b, which is also arranged concentrically with respect to, and spaced from, the main cyclone-shaped screening member 2, separates the finely divided dust particles from that portion of the air or gas which has passed through the main screening member 2 without having had all the dust particles dispersed therein separated therefrom by the screening member 2. All precipitated granulated particles are discharged from the apparatus by means of a bucket wheel 6.

The process of the invention may also be carried out by using an apparatus having only the inner supplementary screening member 3a, but no outer supplementary screening member 3b, or by using an apparatus having only the outer supplementary screening member 3b, but no inner supplementary screening member 3a.

An arrangement in accordance with the invention advantageously consists of the embodiment shown in FIG. 3 wherein inner screening member 3a has the same configuration as the main cyclone-shaped screening member 2 along its entire length, extends downwardly and preferably is about the same length as the outer screening member 3b and the main screen member 2.

I claim:

1. An arrangement for separating out fine solid particles dispersed in gases comprising a conically shaped cyclone container, a conically shaped cyclone-like element which is pervious to gas and said solid particles and which is arranged in said container at a distance from the inside wall and coextensive with respect to said inside wall, said cyclone-like element being capable of deforming under the flow of said gas, at least one inner screening member being arranged concentrically with respect to and spaced from said conically shaped cyclone-like element, said inner screening member having the same configuration as the main cyclone-like element along at least the upper portion thereof and a common discharge chamber for the cyclone container and the cyclone-like element.

2. An arrangement for separating out fine solid particles dispersed in gases, comprising a conically shaped cyclone container, a conically shaped cyclone-like element which is pervious to gas and said solid particles and which is arranged in said container at a distance from the inside wall and coextensive with respect to said inside wall, said cyclone-like element being capable of deforming under the flow of said gas, at least one outer screening member being arranged concentrically with respect to and spaced from said conically shaped cyclone-like element between said cyclone-like element and said inside wall, said outer screening member having the same configuration as the main cyclone-like element and a common discharge chamber for the cyclone container and the cyclone-like element.

3. An arrangement for separating out fine solid particles dispersed in gases, comprising a conically shaped cyclone container, a conically shaped cyclone-like element which is pervious to gas and said solid particles and which is arranged in said container at a distance from the inside wall and coextensive with respect to said inside wall, said cyclone-like element being capable of deforming under the flow of said gas, at least one inner and at least one outer screening member being arranged concentrically with respect to and spaced from said conically shaped cyclone-like element, said outer screening member being positioned between said conically shaped cyclone-like element and said inside wall, said outer screening member having the same configuration as the main cyclone-like element and said inner screening member having the same configuration as the main cyclone element along at least the upper portion thereof and a common discharge chamber for the cyclone container and the cyclone-like element.

References Cited in the file of this patent

UNITED STATES PATENTS

| | | |
|---|---|---|
| 409,025 | Downton | Aug. 13, 1889 |
| 526,334 | Volm | Sept. 18, 1894 |
| 938,656 | Frickey | Nov. 2, 1909 |
| 940,827 | Sheward | Nov. 23, 1909 |
| 1,505,744 | Stebbins | Aug. 19, 1924 |
| 1,856,685 | Anderson | May 3, 1932 |
| 2,116,085 | Van Berkel | May 3, 1938 |
| 2,471,326 | Hoyt | May 24, 1949 |
| 2,511,967 | Campbell | June 20, 1950 |

FOREIGN PATENTS

| | | |
|---|---|---|
| 5,150 | Great Britain | Mar. 2, 1904 |
| 764,871 | Great Britain | Jan. 2, 1957 |